(12) United States Patent
Kahn (10) Patent No.: US 8,405,369 B1
(45) Date of Patent: Mar. 26, 2013

(54) SCALING CHARGE DELIVERY IN DISCONTINUOUS MODE SWITCHING REGULATION

(75) Inventor: Seth Kahn, San Francisco, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 451 days.

(21) Appl. No.: 12/436,649

(22) Filed: May 6, 2009

Related U.S. Application Data (60) Provisional application No. 61/050,981, filed on May 6, 2008.

(51) Int. Cl.
*G05F 1/40* (2006.01)

(52) U.S. Cl. ........................................ 323/271; 323/284

(58) Field of Classification Search .......... 323/282–288, 323/351
See application file for complete search history.

(56) References Cited

U.S. PATENT DOCUMENTS

| | | | |
|---|---|---|---|
| 5,959,443 A * | 9/1999 | Littlefield | 323/287 |
| 6,100,676 A | 8/2000 | Burstein et al. | |
| 6,498,467 B1 | 12/2002 | Stratakos | |
| 6,859,020 B2 * | 2/2005 | Baldwin et al. | 323/283 |
| 6,917,188 B2 * | 7/2005 | Kernahan | 323/282 |
| 7,030,596 B1 * | 4/2006 | Salerno et al. | 323/282 |
| 7,522,436 B2 | 4/2009 | Schultz et al. | |
| 8,018,208 B1 * | 9/2011 | Kahn et al. | 323/224 |
| 2007/0076454 A1 | 4/2007 | Burstein et al. | |

FOREIGN PATENT DOCUMENTS

| | | |
|---|---|---|
| EP | 1256162 A1 | 11/2002 |
| WO | WO 02/03537 A1 | 1/2002 |

* cited by examiner

*Primary Examiner* — Jessica Han
(74) *Attorney, Agent, or Firm* — Fish & Richardson P.C.

(57) ABSTRACT

A voltage regulator is operated by determining whether a desired output current is below a threshold, and when the desired output current is below the threshold, generating a sequence of current pulses in a discontinuous current mode. A maximum current of the pulses is a function of the desired output current.

18 Claims, 5 Drawing Sheets

SCALING CHARGE DELIVERY IN DISCONTINUOUS MODE SWITCHING REGULATION

CROSS-REFERENCE TO RELATED APPLICATIONS

This application claims priority to U.S. Provisional Application Ser. No. 61/050,981, filed on May 6, 2008.

TECHNICAL FIELD

This disclosure relates generally to control systems for switching voltage regulators.

BACKGROUND

Voltage regulators, such as DC to DC converters, are used to provide stable voltage sources for electronic systems, particularly electronic systems that include integrated circuits. Efficient DC to DC converters are particularly needed for battery management in low power devices, such as laptop notebooks and cellular phones, but are also needed for higher power demand products, e.g., desktop computers or servers. Switching voltage regulators (or more simply "switching regulators") are known to be an efficient type of DC to DC converter. A switching regulator generates an output voltage by converting an input DC voltage into a high frequency voltage, and filtering the high frequency voltage to generate the output DC voltage. Typically, the switching regulator includes a switch for alternately coupling and de-coupling an unregulated input DC voltage source, such as a battery, to a load, such as an integrated circuit. An output filter, typically including an inductor and a capacitor, is coupled between the input voltage source and the load to filter the output of the switch and thus provide the output DC voltage. A controller measures an electrical characteristic of the circuit, e.g., the voltage or current passing through the load, and sets the duty cycle of the switch in order to maintain the output DC voltage at a substantially uniform level. Current-mode control is one way of controlling the switching behavior of the switching components. Current-mode control measures the current across the load and attempts to maintain a specific current over the load.

Voltage regulators for microprocessors are subject to ever more stringent performance requirements. One trend is to operate at ever lower voltage and at higher currents. Another trend is to turn on or off different parts of the microprocessor in each cycle in order to conserve power. This requires that the voltage regulator react very quickly to changes in the load, e.g., several nanoseconds to shift from the minimum to the maximum load, and to have a fast transient response, e.g., to quickly stabilize without significant voltage or current ripple.

Still another trend is to place the voltage regulator close to the microprocessor in order to reduce parasitic capacitance, resistance and/or inductance in the connecting lines and thereby avoid power losses. However, in order to place the voltage regulator close to the microprocessor, the voltage regulator needs to be small and have a convenient form factor.

SUMMARY

In one aspect, a voltage regulator has an input terminal for coupling to a voltage source and an output terminal for coupling to a load through an inductor. The voltage regulator includes a switch configured to alternately couple and decouple the voltage source through the inductor to the load, feedback circuitry including an amplifier having a first input configured to receive a desired voltage, a second input, and an output, a capacitor connecting the second input to the output of the amplifier, and a resistor connecting the output of the amplifier and the output terminal such that a feedback current proportional to a difference between the desired voltage and an output voltage at the output terminal flows through the resistor, a current sensor configured to measure the feedback current, and a controller configured to receive the feedback current level from the current sensor and, in response thereto, to control the switch to couple the voltage source through the inductor to the load until an upper peak limit is reached and decouple the voltage source from the load until a lower peak limit is reached.

In another aspect, a voltage regulator includes a switch configured to alternately couple and decouple the voltage source through the inductor to the load, a feedback circuitry configured to generate a feedback current proportional to a difference between a desired voltage and an output voltage at the output terminal, a current sensor configured to measure the feedback current, a controller configured to receive the feedback current level from the current sensor and, in response thereto, to control the switch to couple the voltage source through the inductor to the load until an upper peak limit is reached and decouple the voltage source from the load until a lower peak limit is reached, a current mirror configured to generate a reporting current proportional to the feedback current, a resistor through which the reporting current passes, and reporting circuitry to measure a voltage across the resistor.

In another aspect, a method of operating a voltage regulator can include determining whether a desired output current is below a threshold, and when the desired output current is below the threshold, generating a sequence of current pulses in a discontinuous current mode, wherein the maximum current of the pulses is a function of the desired output current.

In another aspect, a method of operating a voltage regulator includes, for a finite number of current pulses during a voltage regular start mode, monotonically increasing the maximum current of the current pulses and a target voltage.

DETAILED DESCRIPTION

Figure 1:
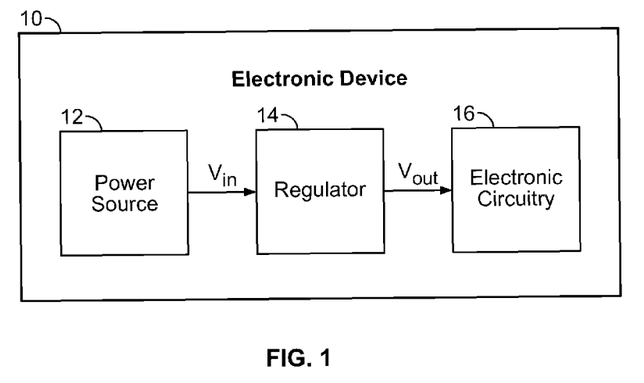
FIG. 1 is a block diagram of an exemplary switching regulator.

FIG. 1 depicts a block diagram illustrating exemplary use of a current-mode-control switching regulator 14 within an electronic device 10. Regulator 14 conditions power from a power source 12 for use by electronic circuitry 16. Electronic device 10 is, for example, a mobile phone; power source 12 is, for example, a rechargeable battery; and electronic circuitry 16 is, for example, circuitry within the mobile phone.

Figure 2:
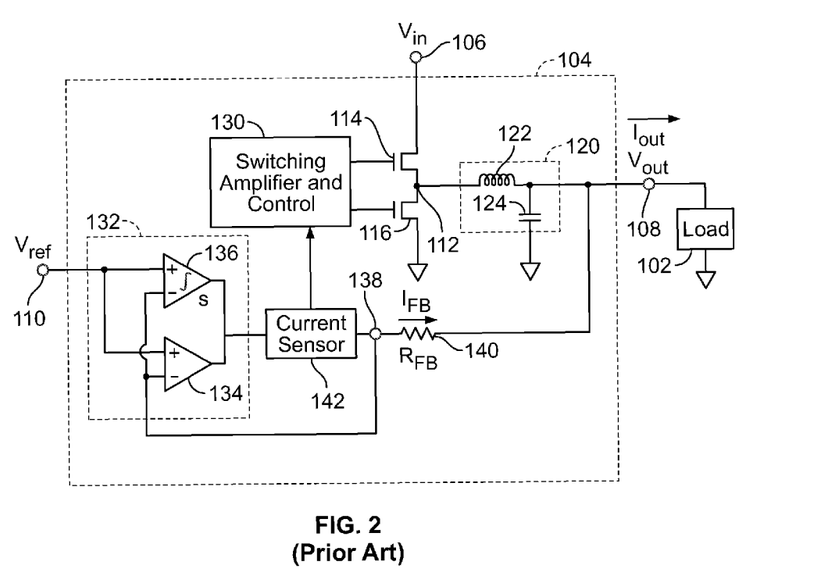
FIG. 2 is a schematic and circuit diagram illustrating a prior current-mode-control switching regulator.

FIG. 2 depicts a prior current-mode control voltage regulator 104. Voltage regulator 104 is coupled to a voltage source with an input voltage $V_{in}$ at a voltage input terminal 106. A voltage output terminal 108 of regulator 104 couples to a load 102. A desired output voltage reference $V_{ref}$ is input to regulator 104 at terminal 110.

The voltage regulator 104 includes a switching circuit which serves as a power switch for alternately coupling and decoupling the input terminal 106 to an intermediate node 112. The switching circuit includes a high-side power transistor 114 having a drain connected to the input terminal 106 and a source connected to the intermediate node 112, and a low-side power transistor 116 having a source connected to ground and a drain connected to the intermediate node 112. The opening and closing of the switching circuit generates an intermediate voltage $V_{int}$ having a rectangular waveform at the intermediate node 112. The intermediate voltage $V_{int}$ is directed through a filter 120 that includes an inductor 122 and a load capacitor 124 connected in parallel with load 102 to generate a generally stable output voltage $V_{out}$ at the output terminal 108.

The power transistors 114 and 116 can be controlled by a switching amplifier and controller 130. To provide a control signal to the controller 130, an error amplifier 132 compares the desired output voltage reference $V_{ref}$ with a voltage $V_{FB}$ at a terminal 138. The error amplifier 132 includes a high frequency transconductance stage 134 and a low frequency integrator 136. The $V_{ref}$ terminal 110 is connected to the positive inputs of the error amplifier 132, and terminal 138 is connected to the negative inputs of the error amplifier 132 and to load 102 by a feedback resistor 140. Error amplifier 132 operates to maintain voltage $V_{FB}$ at terminal 138 equal to $V_{ref}$ by passing a current $I_{FB}$ through resistor 140. The current through resistor 140 causes a voltage drop across resistor 140 equal to the voltage difference between $V_{ref}$ and the voltage across load 102. Current $I_{FB}$ is thereby indicative of the error in voltage across load 102, i.e., the difference between the voltage across the load and the desired voltage $V_{ref}$. The current $I_{FB}$ is sensed by a current sensor 142 and this data is directed to the controller 130. The controller 130 and error amplifier act as a feedback loop so that the $I_{FB}*K_I=I_{LOAD}$, where $I_{LOAD}$ is the average current through the load, i.e., the average of the instantaneous output current $I_{OUT}$, and $K_I$ is a gain. In one embodiment, the gain factor ($K_I$) can be approximately 120,000. The configuration of the voltage regulator 104 creates a droop voltage, i.e., as current flow to the load increases, the output voltage will drop. The slope of the droop will be $R_{FB}/K_I$.

Figure 3:
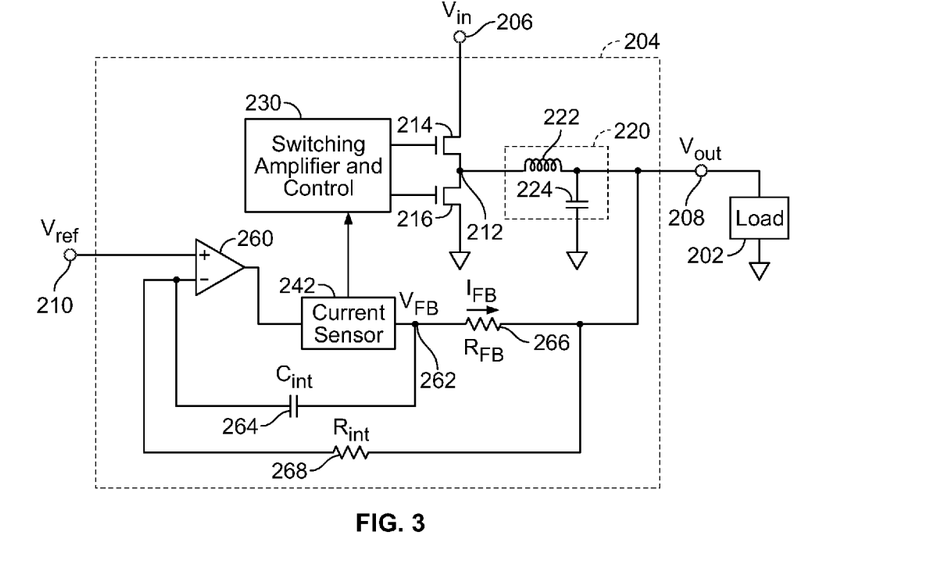
FIG. 3 is a schematic and circuit diagram illustrating an implementation of a current-mode-control switching regulator.

FIG. 3 depicts an implementation of a current-mode control voltage regulator 204. Voltage regulator 204 is coupled to a voltage source with an input voltage $V_{in}$ at a voltage input terminal 206. A voltage output terminal 208 of regulator 204 couples to a load 202. A desired output voltage reference $V_{ref}$ is input to regulator 204 at terminal 210.

The voltage regulator 204 includes a switching circuit which serves as a power switch for alternately coupling and decoupling the input terminal 206 to an intermediate node 212. The switching circuit also includes a rectifier, such as a switch or diode, coupling the intermediate node 212 to a low voltage line, e.g., ground. In particular, the switching circuit can include a high-side power transistor 214 having a drain connected to the input terminal 206 and a source connected to the intermediate node 212, and a low-side power transistor 216 having a source connected to ground and a drain connected to the intermediate node 212. The opening and closing of the switching circuit generates an intermediate voltage $V_{int}$ having a rectangular waveform at the intermediate node 212.

The intermediate voltage $V_{int}$ is directed through a filter 220 that includes an inductor 222 and a load capacitor 224 connected in parallel with load 202 to generate a generally stable output voltage $V_{out}$ at the output terminal 208. The inductor 222 and capacitor 224 can be discrete components, e.g., on the same circuit board as the chip with the switches 214 and 216 and controller 230, or can be integrated into the chip with the switches 214 and 216 and controller 230.

Although only one switching circuit is illustrated in FIG. 3, the voltage regulator can include multiple switching circuits in parallel, each switching circuit having its own inductor. The outputs of the inductors can be connected to provide the output current, and the inductors can be coupled, e.g., wound around a common core, e.g., with each winding made in the same orientation.

The power transistors 214 and 216 can be controlled by a switching amplifier and controller 230. To provide a control signal to the controller 230, the desired output voltage reference $V_{ref}$ is input to the positive input of an amplifier 260, e.g., a single simple op-amp. The output of the amplifier 260 is connected to a current sensor 242, such as a current mirror, that measures the current flowing through a terminal 262. The terminal 262 is connected to the negative input of the amplifier 260 through a capacitor 264 with capacitance $C_{int}$. Output terminal 208 and load 202 are connected to terminal 262 by a feedback resistor 266 with resistance $R_{FB}$, and are also connected to the negative input of the amplifier 260 through another resistor 268 with resistance $R_{int}$. The resistance $R_{int}$ is greater, e.g., by an order of magnitude or more, than the resistance $R_{FB}$.

This switching amplifier 230 is designed to work in conjunction with the sensed current information from current sensor 242 to control power transistors 214 and 216 to alternate the connection of intermediate terminal 212 between terminal 206 and ground. Low-side power transistor 216 stays on until the switching amplifier and control circuit 230 determines that the feedback current $I_{FB}$, as measured by current sensor 242, remains above a pre-determined threshold below the average output current through terminal 212. After switching amplifier 230 determines the current threshold is surpassed, the low-side power transistor 216 is disabled and the high-side power transistor 214 is enabled. The switching amplifier 230 then continues to monitor the current sensor 242 output until it crosses a pre-determined threshold above the average out current through terminal 212. At this point, the switching amplifier 230 then disables high-side power transistor 214 and enables low-side power transistor 216.

Switching regulator 204 thereby operates to connect load 202 to the voltage source when the voltage across load 202 is less than $V_{ref}$, and disconnects load 202 from the voltage source when the voltage across load 202 is greater than $V_{ref}$. The resulting waveform of current $I_{OUT}$ is, in this example, triangular. The average value of the triangular waveform $I_{OUT}$ is equal to $I_{FB}*K_I$. The difference between the upper and lower peaks of the $I_{OUT}$ current triangle (output current ripple) is equal to $K_I$ multiplied by the difference between the upper and lower thresholds to which the switching amplifier 230 compares $I_{FB}$.

At high frequencies, the capacitor 264 acts as a short, and since $R_{int} \gg R_{FB}$, current flow through resistor 268 will be negligible, and the voltages on the left and right sides (as shown in FIG. 3) of the op-amp 260 will be forced to be equal. Amplifier 260 operates to maintain voltage $V_{FB}$ at terminal 262 equal to $V_{ref}$ by passing a current $I_{FB}$ through resistor 266. The current through resistor 266 causes a voltage drop across resistor 266 equal to the voltage difference between $V_{ref}$ and the voltage across load 202. Current $I_{FB}$ is thereby indicative of the error in voltage across load 202, i.e., the difference between the voltage across the load and the desired voltage $V_{ref}$.

At low frequencies, the capacitor 264 acts as a large impedance, so that the amplifier 260 is sensing $V_{out}$, and thereby integrates away the error. As a result, the voltage regulator 204 does not have a droop voltage, e.g., as current flow to the load increases, the output voltage remains substantially constant.

Figure 4A:
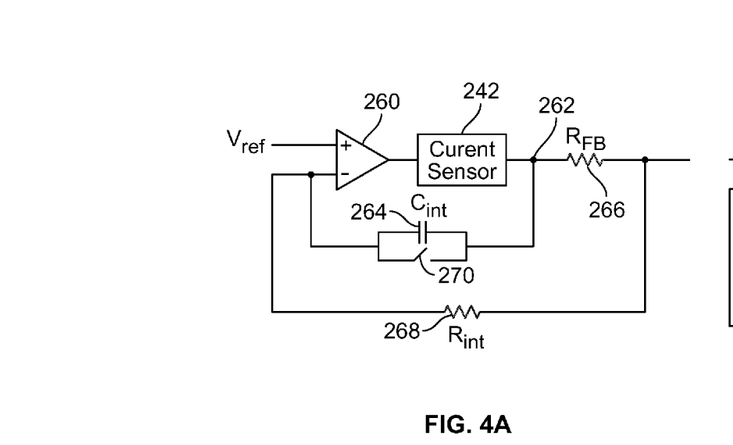
FIG. 4A is a schematic and circuit diagram illustrating a portion of a current-mode-control switching regulator that is switchable between droop and no-droop modes.

FIG. 4A depicts another implementation of a current-mode control voltage regulator which is switchable between droop and no-droop modes. This implementation is similar to the implementation illustrated in FIG. 3, but a switch 270 is added in parallel with the capacitor 264. If the switch is open, the voltage regulator acts similarly to the implementation illustrated in FIG. 3, with no droop voltage. If the switch is closed, since $R_{int} \gg R_{FB}$, current flow through resistor 268 will be negligible, and thus the voltage regulator acts similarly to the implementation illustrated in FIG. 2, with a droop voltage.

Figure 4B:
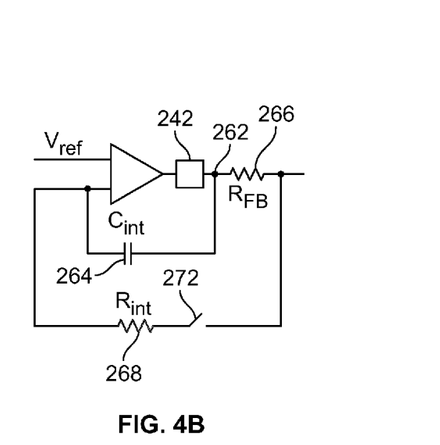
FIG. 4B is a schematic and circuit diagram illustrating another implementation of a portion of a current-mode-control switching regulator that is switchable between droop and no-droop modes.

FIG. 4B depicts another implementation of a current-mode control voltage regulator which is switchable between droop and no-droop modes. This implementation is similar to the implementation illustrated in FIG. 3, but a second switch 272 is added in series with resistor 268. Opening the switch 272 disconnects the path of resistor 268, and thus the voltage regulator acts similarly to the implementation illustrated in FIG. 2, with a droop voltage.

Some implementations of the current-mode control voltage regulator include current reporting circuitry. The reporting circuitry can direct a signal that is proportional to the output current $I_{OUT}$ flowing into the load to an output terminal of the voltage regulator. For example, the output terminal can be connected to an external processor, i.e., a processor that is not part of the voltage regulator, e.g., a CPU of a computer system powered by the voltage regulator. In particular, the reporting circuitry can generate a signal that is proportional to the error current $I_{FB}$, and thus proportional to the output current $I_{OUT}$.

Figure 5:
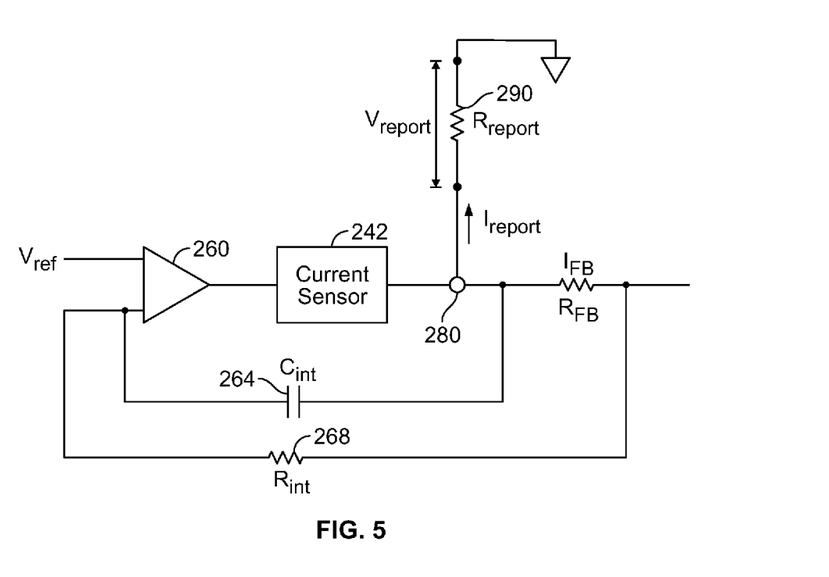
FIG. 5 is a schematic and circuit diagram illustrating a portion of a current-mode-control switching regulator that include current reporting circuitry.

FIG. 5 illustrates an implementation in which a current mirror 280 generates reporting current $I_{report}$ that is a mirror of the feedback current $I_{FB}$, e.g., $I_{report} = I_{FB}*K_2$, where $K_2$ is a constant, e.g., 1.

In some implementations, the reporting current $I_{report}$ is directed through a reporting resistor 290 with resistance $R_{report}$ to ground. The voltage $V_{report}$ across the reporting resistor 290 is thus proportional to the error current $I_{FB}$. The voltage $V_{report}$ can be sensed and used for testing or reported to the microprocessor, e.g., for calculation of an estimated battery life. For example, because the voltage $V_{report}$ is proportional to the load, the voltage $V_{report}$ provides a measure of the power usage. The microprocessor can calculate the estimated battery life from the current battery power P and the power usage dP/dt determined from the voltage $V_{report}$, e.g., $dP/dt = V_{report}*K_3$, where $K_3$ is a constant. For example, under the assumption that the power usage will remain constant, the estimated battery life $T_{BL}$ can be calculated from the voltage $V_{report}$, e.g., $T_{BL} = P/(V_{report}*K_3)$.

In some implementations, the external resistor is not needed and reporting current $I_{report}$ is directed to the output terminal for current reporting instead of a voltage. In some implementations, the processor can monitor the voltage across the $R_{FB}$ resistor, since this voltage is directly proportional to $I_{FB}$. This voltage can be internally buffered to an output pin for direct monitoring by the user. In some implementations, this voltage can be buffered across another reference resistor to form a new current proportional to $I_{FB}$. This new current can then be used similarly to the reporting current as described above.

Although FIG. 5 illustrates the current mirror 280 as located between the current sensor 242 and the feedback resistor 266, the current mirror 280 could be between the current sensor 242 and the amplifier 260, or the current mirror 280 could mirror the current flowing out of the current sensor 242 to the controller 230.

Although illustrated in conjunction with the voltage regulator of FIG. 3, the current reporting circuitry could instead be used in conjunction with the voltage regulators of FIG. 2 or 4, or with other configurations.

In normal continuous mode operation, the transistors 214 and 216 are driven by the controller 230 to deliver a large multiple of the feedback current $I_{FB}$ to the load 202. Excepting possibly for brief periods at change-over to prevent momentary direct connection of the input voltage to ground, at least one of the transistors 214 and 216 remains closed.

The output current from terminal 212 can form a triangular waveform with an average current that matches the desired current and should match the desired current or the current $I_{LOAD}$ drawn by the load. The output current can have a peak height of $I_{peak}$.

Figure 6:
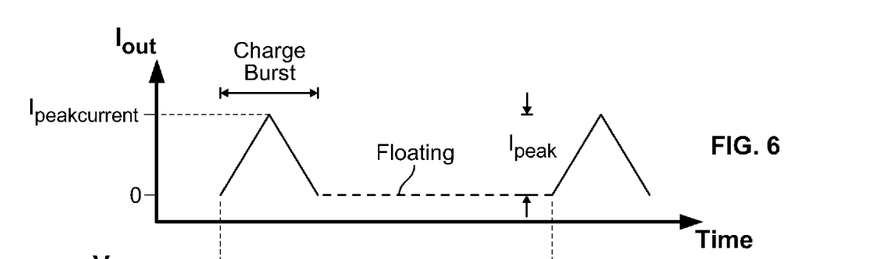
FIG. 6 is a graph of output current as a function of time in a discontinuous mode of a switching regulator.
Figure 7:
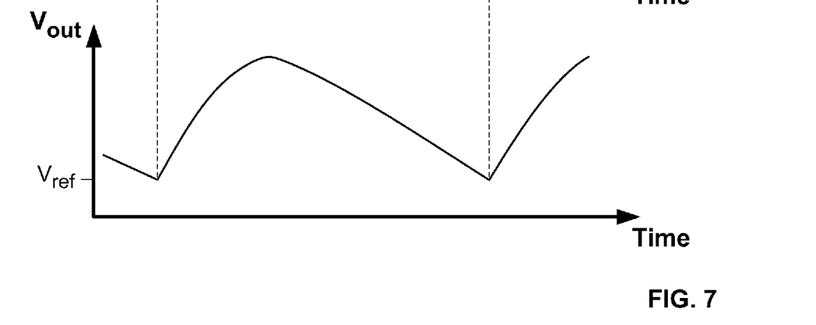
FIG. 7 is a graph of output voltage as a function of time in a discontinuous mode of a switching regulator.

At light load conditions, e.g., if $I_{LOAD}$ is below a threshold, e.g., $I_{peak}/2$, the switching regulator can operate in a discontinuous current mode. In particular, the switch can be operated in a tristate, so that at certain times both transistors 214 and 216 are left open and the intermediate terminal 212 is left floating. Referring to FIGS. 6 and 7, when the output voltage drops $V_{out}$ below the desired reference voltage $V_{ref}$, feedback current $I_{FB}$ becomes positive, and controller 230 closes the transistor 214 to connect the intermediate terminal 212 to the voltage source. This causes the current flow to ramp up, and also causes the voltage to increase. When the current reaches a current peak threshold $I_{PEAKCURRENT}$, the transistor 214 is opened and transistor 216 is closed. This causes the current flow to ramp down. When the current flow reaches zero, both transistors 214 and 216 are left open. As a result, a positive "charge burst", which can be a triangular waveform, is dumped into the capacitor 224. The load then drains the charge from the capacitor, causing the output voltage $V_{out}$ to gradually decline until it reaches the reference voltage $V_{ref}$ again, triggering another charge burst.

Figure 8:
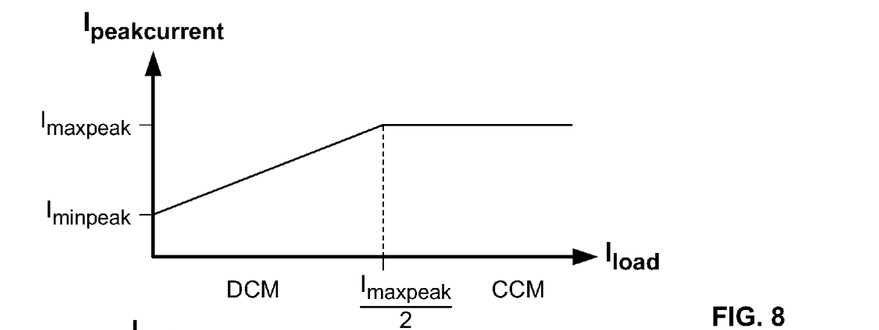
FIG. 8 is a graph of maximum current as a function of desired output current.

However, the current peak threshold $I_{PEAKCURRENT}$ need not be a constant value. In particular, in the discontinuous mode ("DCM"), the current peak threshold $I_{PEAKCURRENT}$ can be a function of the average output current $I_{LOAD}$ or the desired current. As shown in FIG. 8, at output current near zero, the current peak threshold $I_{PEAKCURRENT}$ can start from a lower, e.g., minimum, threshold $I_{MINPEAK}$ that is a fractional value, e.g., one-quarter, one-third or one-half, of the maximum threshold $I_{MAXPEAK}$. As the output current $I_{LOAD}$ increases, the current peak threshold $I_{PEAKCURRENT}$ increases, e.g., monotonically. In some implementations, at an output current $I_{LOAD}$ equal to or greater than half the maximum peak threshold, $I_{MAXPEAK}/2$, the current peak threshold $I_{PEAKCURRENT}$ is equal to the maximum threshold $I_{MAXPEAK}$. In some implementations, the current peak threshold increases linearly from the minimum threshold $I_{MINPEAK}$ to the maximum threshold $I_{MAXPEAK}$. However, other functions can relate the current peak threshold $I_{PEAKCURRENT}$ to the output current $I_{LOAD}$.

Figure 9A:
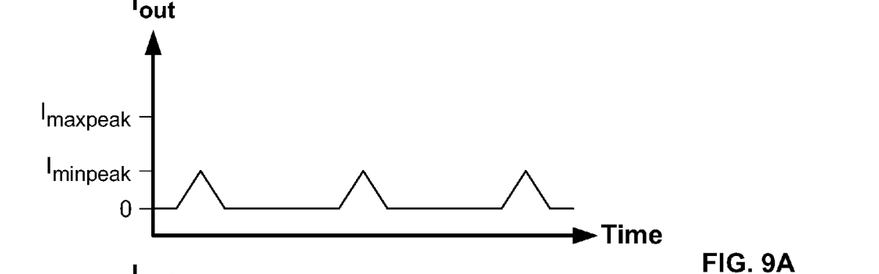
FIGS. 9A-9C are graphs of output current as a function of time for low, medium and high desired current in a discontinuous mode of a switching regulator.
Figure 9B:
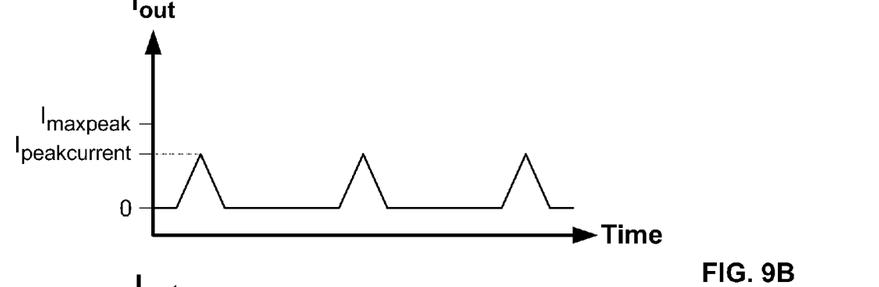
Figure 9C:
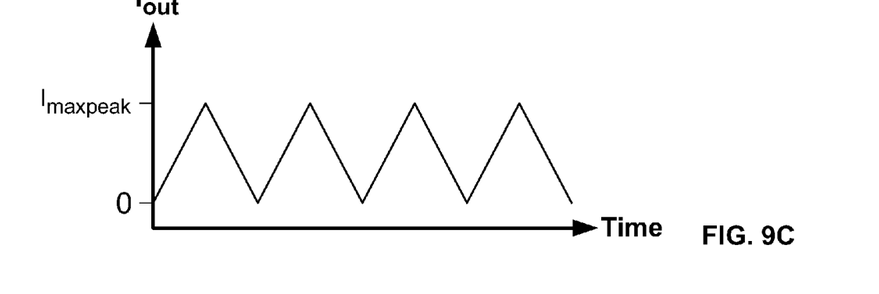

As a result, as shown in FIGS. 9A-9C, as the desired output current increases, the current pulses get larger, until at the transition between the continuous and discontinuous modes, the current pulses touch and have the peak current $I_{MAXPEAK}$. In addition, because the current pulses are smaller at low desired current, voltage ripple can be reduced at low current conditions. Optionally, the pulse frequency can increase as the desired output current increases.

A problem with systems in which a typical constant peak current is used instead is that the voltage ripple increases as the load current gets smaller. The maximum output voltage ripple is commonly considered an important specification and therefore can restrict the peak current used from being too large. On the other hand, large peak current values are desired since they tend to lead to higher efficiency in light load conditions and allow the discontinuous mode algorithm to operate up to a higher $I_{LOAD}$ current level. The technique discussed above allows the discontinuous mode to have a scalable peak current that can counteract the trend of voltage ripple increasing as load decreases while still supporting the larger peak current at reasonable load currents. As a result, the voltage regulator can have improved efficiency and discontinuous mode current capability.

In constant peak current discontinuous mode implementations, the switching frequency of the regulator is directly proportional to the load current as the regulator delivers a fixed charge pulse per switching event. In order to sustain output voltage regulation, the control circuitry will modulate the frequency of switching events so that the average charge delivery to the output node is equivalent to that withdrawn by the load. With the scalable peak current technique, the charge per pulse delivered is set to be a function of the average output current. This results in a non-linear relationship between load current and discontinuous switching frequency. Another benefit of this technique is that the relationship between the actual frequency and load current can therefore be tuned or limited by adjusting the functional relationship between the scalable charge pulses and the average output current. For example, this could be useful in mobile systems where a high efficiency discontinuous mode algorithm is desired but it is desired to place a lower limit on the switching frequency to prevent it from dropping into the audible frequency range.

In some implementations, the discontinuous regulator charge pulse can be set by controlling the high side switch on-time as opposed to a peak current level. In such implementations, the on-time can be modulated as a function of the average output current to achieve substantially similar benefits as those described above.

Figure 10:
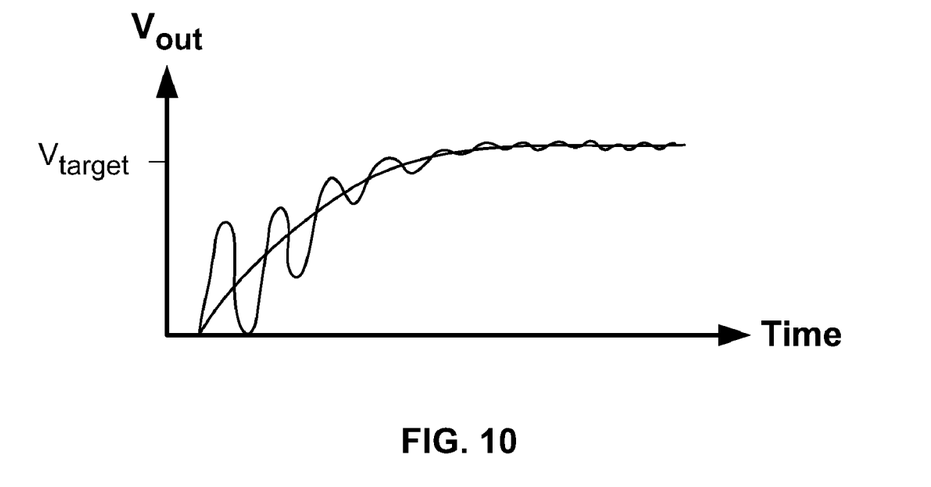
FIG. 10 is a graph of output voltage and reference voltage as a function of time during a start-up operation.

When a voltage regulator is turned on, the regulator can move from off to maximum current capacity, resulting in an in-rush current that the input voltage may not be able to support. This could affect the voltage supply. In addition, $V_{out}$ may overshoot the desired reference voltage $V_{ref}$. Even if, as illustrated by FIG. 10, the voltage reference is adjusted with a "soft start" to ramp from a lower voltage up to the eventual target voltage $V_{target}$ ($V_{target}$ becomes the reference voltage $V_{ref}$ in the usual operating conditions described in the embodiments above), the initial current pulses can cause the output voltage to overshoot the reference voltage $V_{ref}$.

A technique to counteract this problem is to limit both the peak current and the ramp up the reference voltage $V_{ref}$ during start-up conditions. A conventional "soft start" ramp on $V_{ref}$ may be insufficient in and of itself to solve the overshooting problems noted above; enhancing startup by limiting the peak current can further reduce overshooting. As a consequence of limiting the peak current on a cycle to cycle basis, the duty cycle will also be limited.

The start-up conditions can be the initial few pulses, e.g., less than ten pulses, e.g., the first five or four or three pulses. The peak current can grow monotonically during the start-up conditions, with initial growth being exponential, e.g., doubling each pulse, and later growth being linear. The maximum current of a particular current pulse can be a discrete function of the ordinal that pulse. For example, the first pulse can be limited to $I_{max}/8$, the second pulse can be limited to $I_{max}/4$, third pulse can be limited to $I_{max}/2$, and the fourth pulse can be limited to $3/4 * I_{max}$. This technique limits the current and thus reduces the likelihood of overshooting.

Another potential benefit can be that even with a soft start on $V_{target}$, the voltage regulator can get large in-rush current because the current required to be delivered out of terminal 208 is directly proportional to $C_{OUT}$ 224. Therefore even with very slow $V_{target}$ ramps, the current required to ramp $V_{OUT}$ van be arbitrarily large when $C_{OUT}$ 224 is arbitrarily increased in value. On the other hand, limiting the peak current during the initial pulses on startup directly limits the in-rush current.

In some implementations, during the start-up conditions the peak current can be limited as a function of time instead of a specific number of pulse events. For example, the duty cycle can grow monotonically with time during the start-up. Also, the limiting can be determined from an analog function, e.g., a continuous function of time with a value determined by the time of the pulse, instead of discrete steps. Again, this method will reduce both initial overshoot as well as in-rush current on the input supply.

The controller that controls the switch can be implemented with hardware (digital and/or analog), firmware or software, i.e., a computer program product tangibly embodied in a computer readable medium and including instructions to be executed by a processor, e.g., a microprocessor in the controller. The instructions can carry out a control algorithm to control the switches to generate the pulses as discussed above.

Those skilled in the art will appreciate that variations from the specific embodiments disclosed above are contemplated by the invention. The invention should not be restricted to the above embodiments, but should be measured by the following claims.

What is claimed is:

1. A method of operating a voltage regulator, comprising:
   determining whether a desired output current is below a threshold;
   when the desired output current is below the threshold, generating a sequence of current pulses in a discontinuous current mode, including
      determining a high-side time as a function of a desired output current, the high-side time having a preset minimum and increasing as a linear function of the desired output current,
      closing a power switch,
      determining when the power switch has been closed for said high-side time, and opening the power switch when the power switch has been closed for said high-side time, such that a maximum current of the pulses is a function of the desired output current.

2. The method of claim 1, further comprising, when the desired output current is above the threshold, generating a sequence of current pulses in a continuous current mode.

3. The method of claim 2, wherein the current pulses in the continuous current mode have a peak height of $I_{peak}$.

4. The method of claim 3, wherein the threshold is about equal to $I_{peak}/2$.

5. The method of claim 1, wherein the function used to determine the high-side time is a monotonically increasing function of the desired output current.

6. The method of claim 5, wherein the function used to determine the high-side time varies from a lower value to a higher value, the lower value being at most one half of the higher value.

7. The method of claim 6, wherein the function used to determine the high-side time is linear from the lower value to the higher value.

8. The method of claim 6, further comprising, when desired output current is above the threshold, generating a sequence of current pulses in the continuous current mode.

9. The method of claim 8, wherein the higher value equals a peak height of the current pulses in the continuous current mode.

10. A controller for a voltage regulator, comprising:
an input terminal to receive a current control signal;
output terminals to transmit switching control signals to a switching circuit to cause the switching circuit to alternate between a first state in which an intermediate terminal is connected to an input terminal of the voltage regulator and a second state in which the intermediate terminal is connected to a ground; and
control circuitry configured to generate the switching control signals on the output terminals to cause the switching circuit to enter the first state until a current pulse reaches a maximum current limit, and wherein the control circuitry is configured to determine whether a desired output current is below a threshold, and when the desired output current is below the threshold, control the switching circuit to generate a sequence of current pulses in a discontinuous current mode, wherein the control circuitry is configured to determine a high-side time as a function of a desired output current, the high-side time having a preset minimum and increasing as a linear function of the desired output current, cause the switching circuit to enter the first state, determine when the switching circuit has been in the first state for said high-side time, and cause the switching circuit to enter the second state when the switching circuit has been in the first state for said high-side time, such that a maximum current of the pulses is a function of the desired output current.

11. The controller of claim 10, wherein the control circuitry is configured to control the switching circuit to, when the desired output current is above the threshold, generate a sequence of current pulses in a continuous current mode.

12. The controller of claim 11, wherein the current pulses in the continuous current mode have a peak height of $I_{peak}$.

13. The controller of claim 12, wherein the threshold is about equal to $I_{peak}/2$.

14. The controller of claim 10, wherein the function used to determine the high-side time is a monotonically increasing function of the desired output current.

15. The controller of claim 14, wherein the function used to determine the high-side time varies from a lower value to a higher value, the lower value being at most one half of the higher value.

16. The controller of claim 15, wherein the function used to determine the high-side time is linear from the lower value to the higher value.

17. The controller of claim 15, wherein the control circuitry is configured to control the switching circuit to, when desired output current is above the threshold, generate a sequence of current pulses in the continuous current mode.

18. The controller of claim 17, wherein the higher value equals a peak height of the current pulses in the continuous current mode.

* * * * *